United States Patent
Kast

(10) Patent No.: US 9,938,877 B2
(45) Date of Patent: Apr. 10, 2018

(54) FUNNEL-PIPE ARRANGEMENT

(71) Applicant: Eberspächer Exhaust Technology GmbH & Co. KG, Neunkirchen (DE)

(72) Inventor: Peter Kast, Esslingen (DE)

(73) Assignee: Eberspächer Exhaust Technology GmbH & Co. KG, Neunkirchen (DE)

( * ) Notice: Subject to any disclaimer, the term of this patent is extended or adjusted under 35 U.S.C. 154(b) by 499 days.

(21) Appl. No.: 14/631,119

(22) Filed: Feb. 25, 2015

(65) Prior Publication Data
US 2015/0240688 A1 Aug. 27, 2015

(30) Foreign Application Priority Data

Feb. 26, 2014 (DE) .......................... 10 2014 203 496

(51) Int. Cl.
*F16L 17/00* (2006.01)
*F01N 3/24* (2006.01)
(Continued)

(52) U.S. Cl.
CPC .............. *F01N 3/24* (2013.01); *F01N 13/185* (2013.01); *F01N 13/1805* (2013.01); *F01N 13/1838* (2013.01); *F01N 13/1877* (2013.01); *F16L 13/0209* (2013.01); *F16L 21/06* (2013.01); *F01N 2470/18* (2013.01); *F01N 2470/20* (2013.01); *Y10T 29/49398* (2015.01); *Y10T 29/49947* (2015.01)

(58) Field of Classification Search
CPC .............. F01N 13/1877; F01N 13/185; F01N 13/1805; F01N 13/1838; F16L 21/06; Y10T 29/49398; Y10T 29/49947

USPC ..... 285/337, 382, 406, 407, 420; 29/890.08; 181/228
See application file for complete search history.

(56) References Cited

U.S. PATENT DOCUMENTS 1,978,195 A * 10/1934 Haas ................... F16L 21/06
24/279
3,581,842 A * 6/1971 Hall ..................... F01N 13/185
181/243
(Continued)

FOREIGN PATENT DOCUMENTS

CN 101936209 A 1/2011
CN 202280982 U 6/2012
(Continued)

*Primary Examiner* — Gregory J Binda
(74) *Attorney, Agent, or Firm* — McGlew and Tuttle, P.C.

(57) ABSTRACT

An arrangement (6) of a pipe (5) on a funnel (4) has a pipe interior space (8) fluidically connected with a funnel interior space (9). The funnel has an integral connection piece (10) with two axial openings (12) in the circumferential direction (11). A connecting sleeve (14), which has a clamping collar (15), which tapers towards the funnel and is formed integrally in one piece with the connecting sleeve (14), is attached to the connection piece on the outside thereof. The pipe is attached to the connection piece with an end section (16) facing the funnel. The end section has a counterclamping collar (17), which is formed integrally in one piece therewith and tapers away from the funnel. A clamp connection (7) has a clamp (18) with a ring-shaped connecting body (19) extending over the clamping collar (15) and the counterclamping collar (17) and prestresses these axially towards one another.

20 Claims, 2 Drawing Sheets

(51) Int. Cl.
*F16L 13/02* (2006.01)
*F16L 21/06* (2006.01)
*F01N 13/18* (2010.01)

(56) References Cited

U.S. PATENT DOCUMENTS

| | | | |
|---|---|---|---|
| 3,889,982 A * | 6/1975 | Trunnell | F16L 23/06 |
| | | | 285/148.11 |
| 3,990,859 A | 11/1976 | Waite | |
| 5,393,108 A | 2/1995 | Kerr | |
| 2008/0028609 A1 | 2/2008 | Umeda et al. | |
| 2008/0277016 A1 | 11/2008 | Covers et al. | |
| 2011/0272941 A1 * | 11/2011 | Broderick | F01N 13/1811 |
| | | | 285/337 |
| 2015/0240688 A1 | 8/2015 | Kast | |

FOREIGN PATENT DOCUMENTS

| | | |
|---|---|---|
| DE | 12 31 977 B | 1/1967 |
| DE | 102 34 378 A1 | 2/2004 |
| EP | 1990514 A1 | 11/2008 |
| FR | 2 138 326 A1 | 1/1973 |
| GB | 1 474 904 A | 5/1977 |
| JP | H08-303239 A | 11/1996 |
| JP | 2002-153930 A | 5/2002 |
| JP | 2005- 188 474 A | 7/2005 |
| JP | 2015161308 A | 9/2015 |

* cited by examiner

FUNNEL-PIPE ARRANGEMENT

CROSS REFERENCE TO RELATED APPLICATIONS

This application claims the benefit of priority under 35 U.S.C. § 119 of German Patent Application DE 10 2014 203 496.5 filed Feb. 26, 2014, the entire contents of which are incorporated herein by reference.

FIELD OF THE INVENTION

The present invention pertains to an arrangement of a pipe at a funnel as well as to a method for manufacturing such an arrangement. Finally, the present invention pertains to an exhaust system, for an internal combustion engine, especially of a motor vehicle, which has at least one such arrangement, to connect an exhaust gas treatment device with a pipe section.

BACKGROUND OF THE INVENTION

Clamp connections are increasingly used in exhaust systems of internal combustion engines, especially in motor vehicles, to connect exhaust gas treatment device with pipe sections. The replacement of the exhaust gas treatment device or of components thereof is simplified hereby.

An exhaust gas treatment device usually has a housing, whose cross section is larger than the cross section of a pipe section leading to the housing and of a pipe section leading away from the housing. Correspondingly, the housings of the exhaust gas treatment device may usually be equipped with an inlet funnel and/or with an outlet funnel, which has a connection piece, via which the respective pipe section is connected to the housing. To make it possible to connect the pipe section to the connection piece by means of a clamp connection sufficiently rigidly, relatively strong forces must be transmitted via the clamp. It is advantageous for a reliable clamp connection if the connection piece and the pipe section are centered or aligned relative to one another, so that the clamp connection must ultimately bring about the axial bracing only.

To center the connection piece relative to the tubular body, it is possible, in principle, to provide an additional support pipe, which is inserted into the connection piece and protrudes axially into the pipe section within the arrangement, in the area of the clamp connection. The support pipe is coordinated to the dimensions of the connection piece and of the pipe section such that the desired alignment or centering is obtained. Further, it is possible, in principle, to weld the connection piece to the support pipe and to establish the clamp connection with the pipe section at the support pipe. In any case, an additional effort is needed as a result when manufacturing the exhaust gas treatment device and when establishing the connection of the pipe section with the housing.

SUMMARY OF THE INVENTION

An object of the present invention is to provide an improved or at least different embodiment, which is characterized by reduced effort and especially by reduced manufacturing costs for a funnel-pipe arrangement and for a corresponding manufacturing method and for an exhaust system equipped therewith.

According to the invention, an arrangement of a pipe on a funnel is provided in which arrangement a pipe interior space is fluidically connected with a funnel interior space and in which the pipe is fastened to the funnel by means of a clamp connection. A connection piece, which has at least two separate, axially open openings in the circumferential direction, is formed integrally in one piece with the funnel. A connecting sleeve, which has a clamping collar tapering towards the funnel and formed integrally in one piece with the connecting sleeve, is attached on the outside to the connection piece. The pipe is attached to the connection piece with an end section facing the funnel. The end section has a counterclamping collar, which is formed integrally in one piece thereon and tapers away from the funnel. The clamp connection has a clamp, which has a ring-shaped connecting body, which extends over the clamping collar and the counterclamping collar and prestresses same axially towards one another.

The present invention is based on the general idea of shaping the connection piece such that, distributed in the circumferential direction, the connection piece has at least two separate, axially open openings at the end face. The connection piece does not extend through these openings as a closed connection piece any more, but in segments. It is achieved due to the openings and that the individual connection piece segments protrude axially into the pipe when the pipe is attached to the connection piece. As a result, the connection piece segments bring about an alignment of the pipe relative to the connection piece. A connecting sleeve, which has a clamping collar tapering towards the funnel, which collar is made integrally in one piece with the connecting sleeve, is attached to the connection piece radially on the outside. The pipe has, in turn, a counterclamping collar, which tapers away from the funnel and is made integrally in one piece with the connection piece, on an end section, which is likewise attached to the connection piece radially on the outside. The clamp connection can now be established with a clamp, the clamp having a ring-shaped connection body, which extends around the clamping collar and the counterclamping collar and prestresses them axially towards each other. On the whole, a sufficiently rigid and stable connection can thus be established between the pipe and the funnel, and an above-mentioned additional pipe section can be eliminated. The manufacture of the arrangement is simplified hereby and it can be carried out at a low cost.

Corresponding to an advantageous embodiment, the clamping collar may be in contact with the counterclamping collar indirectly via a seal or directly. Sufficient sealing can be achieved hereby within the clamp connection.

According to an advantageous embodiment, the connecting sleeve may have, on a side facing the pipe, an axial support surface, which may taper towards the funnel analogously to the clamping collar. Especially if the connecting sleeve is a shaped sheet metal part or also preferably a deep-drawn part. In addition, the end section of the pipe may have, on a side facing the funnel, an axial stop face, at which the support surface can be axially supported, namely, directly or indirectly, e.g., via a sealing element. This mode of construction creates a flat support and especially a flat contacting, which simplifies sufficient sealing within the arrangement. The clamp will now ensure an axial prestressing, with which the support surface is prestressed against the stop face.

Provisions may be made in an advantageous variant for the end section of the pipe to have a comparatively massive design, i.e., be, for example, a cast part or a turned part, in an area having the counterclamping collar and the stop face. Relatively strong axial prestresses can be achieved hereby within the arrangement, and, for example, strong holding forces can be obtained. This is advantageous, for example, when relatively high pressures shall prevail within the pipe or funnel.

In another embodiment, the connecting sleeve may have exactly one interruption in the circumferential direction, as a result of which the connecting sleeve becomes radially elastic. The connecting sleeve is free from interruptions, i.e., it has a closed circular design, in the circumferential direction in an alternative embodiment.

According to another advantageous embodiment, the connecting sleeve may be welded to the connection piece. A closed weld seam that extends fully in the circumferential direction is preferred here for achieving sufficient sealing of the connecting sleeve against the connection piece. The weld seam is arranged in an area of the connection piece that is closed in a ring-shaped manner and axially adjoins the openings.

In another embodiment, the connection piece may be shaped by forming the funnel integrally in one piece at the funnel. The connection piece can be prepared at the funnel at an especially low cost as a result.

An opening, which has an at least biradial, star-shaped cross section, is prepared first in the funnel with the method according to the present invention. The funnel may be subsequently put through in the area of this opening, as a result of which the connection piece can be prepared. The rays of the multiradial star-shaped cross section now generate the axially open openings within the connection piece, which leads to the segmentation of the connection piece in the circumferential direction. After attaching the connecting sleeve and after attaching the pipe to the connection piece, the clamp can be mounted in order to fix the pipe to the connection piece by means of the connecting sleeve.

Before attaching the pipe, it may be advantageous to fasten the connecting sleeve, preferably tightly, to the connection piece, for example, by means of a welded connection or by means of a soldered connection.

The counterclamping collar may be formed integrally in one piece on the end section of the pipe by pulling over or by another forming technique.

According to an advantageous embodiment, the opening in the funnel may be shaped such that the rays of the star-shaped cross section taper from the outside to the inside. This causes the openings forming in the connection piece to widen with increasing distance from the funnel. Stresses within the connection piece, which may occur during the elastic deformation of the connection piece segment, can be reduced hereby.

According to another advantageous embodiment, the cross section of the opening of the funnel may have exactly three or four rays, so that it is essentially Y-shaped or X-shaped. It was found that three or four rays are sufficient to generate sufficiently elastic connection piece segments in the connection piece.

If the star-shaped cross section of the opening of the funnel has a triradial or quadriradial design, a cloverleaf shape can be generated, on the whole, for the cross section of the opening of the funnel in conjunction with the rays tapering from the outside to the inside. As a result, comparatively short connection piece segments, which are characterized by an especially high springiness in the radial direction, are obtained in the circumferential direction.

At least one exhaust gas treatment device is provided in an exhaust system according to the present invention, said exhaust gas treatment device having a housing, which is equipped with at least one funnel on the inlet side or on the outlet side, and the exhaust gas treatment device is connected to a pipe section or to a pipe of the exhaust system, this connection being established by means of a funnel-pipe arrangement of the above-described type.

It is apparent that the above-mentioned features, which will also be explained below, can be used not only in the particular combination described, but also in other combinations or alone without going beyond the scope of the present invention.

Preferred exemplary embodiments of the present invention are shown in the drawings and will be explained in more detail in the following description, in which identical reference numbers designate identical or similar or functionally identical components. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
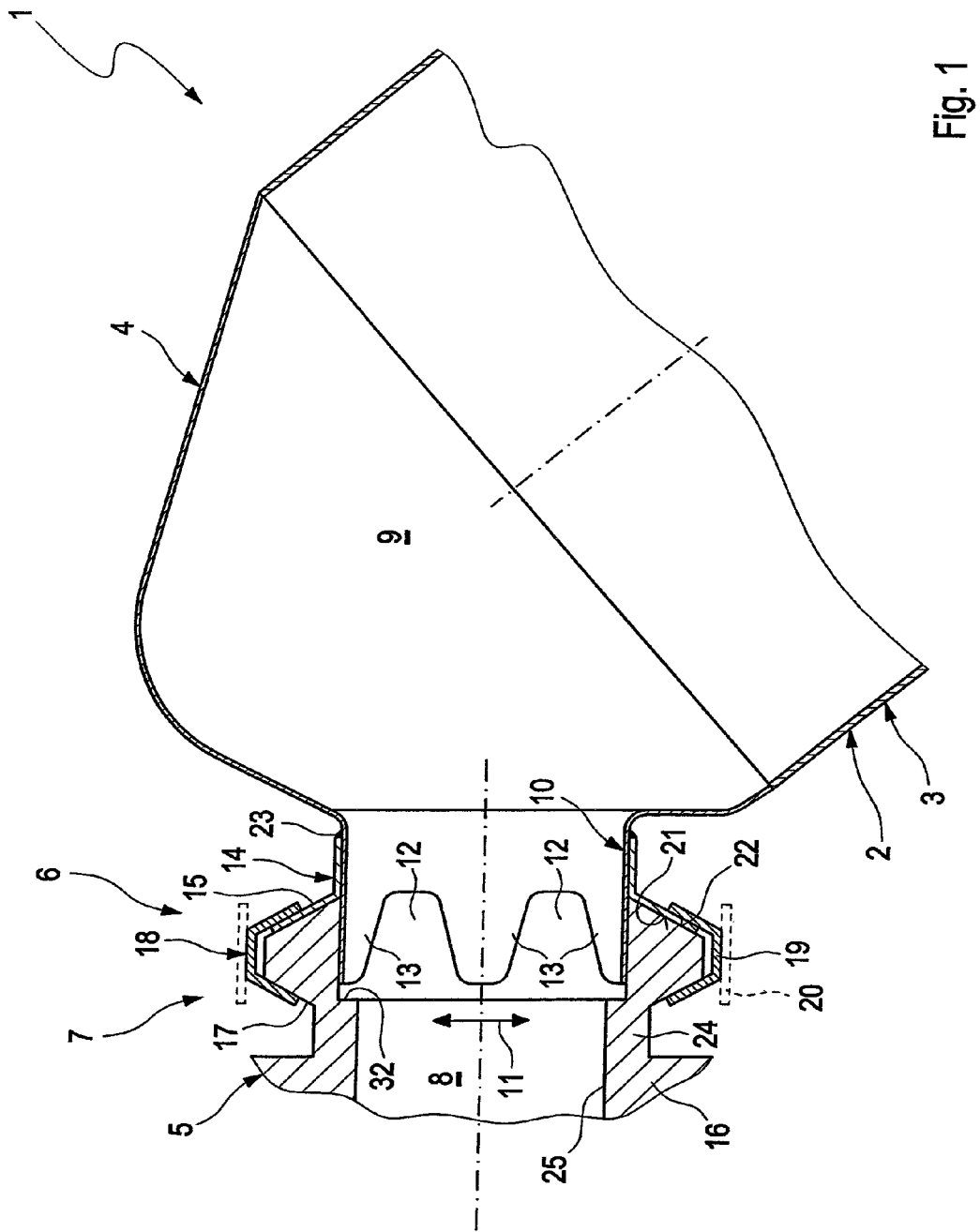
FIG. 1 is a highly simplified longitudinal sectional view of an exhaust system in the area of a funnel-pipe arrangement.

Referring to the drawings, corresponding to FIG. 1, an exhaust system 1, which is shown here only partially, comprises at least one exhaust gas treatment device 2, which has a housing 3, in which at least one treatment element can be arranged depending on the treatment task of the exhaust gas treatment device 2. Such a treatment element may be, for example, a catalytic converter or a particle filter. The housing 3 is provided at one of its axial ends with a funnel 4, via which the housing 3 is connected to a pipe 5 of the exhaust system 1. This connection is embodied with a funnel-pipe arrangement 6, which contains a clamp connection 7.

Only an axial end of the housing 3 can be recognized in FIG. 1. It is clear that the other axial end of the housing 3, which is not shown here, may likewise have a funnel 4, which is connected with another pipe 5. In principle, the same funnel-pipe arrangement 6 may be used, but this is not absolutely necessary.

The exhaust system 1 may also have further exhaust gas treatment device 2, which have a housing 3 each with at least one funnel 4 and are connected with this pipe 5 or with another pipe 5. The same funnel-pipe arrangements 6 may again be used, but this is not absolutely necessary.

The pipe 5 may be designed as a separate exhaust gas pipe or as a connecting branch of another component of the exhaust system 1, e.g., an outlet connection piece or a turbine of an exhaust gas turbocharger.

The funnel-pipe arrangement 6 being shown here, which will hereinafter also be called arrangement 6 for short, makes possible, on the one hand, a fluidic connection between a pipe interior space 8 and a funnel interior space 9. On the other hand, the arrangement 6 makes it possible to fix the pipe 5 to the funnel 4. This fixation is carried out by means of the clamp connection 7. The clamp connection 7 thus fastens the pipe 5 to the funnel 4.

A connection piece 10 is made integrally in one piece with the funnel 4. On its end face facing away from the funnel 4, the connection piece 10 has, distributed in the circumferential direction 11, at least two separate, axially open openings 12, the connection piece 10 is segmented hereby in the circumferential direction 11 in the area of the openings 12, so that a corresponding number of connection piece segments 13, which are spaced apart from each other by the openings 12 in the circumferential direction 11, are present in this segmented area corresponding to the number of openings 12.

The arrangement 6 comprises, besides, a connecting sleeve 14, which is attached to the connection piece 10 radially on the outside and which has a clamping collar 15, which tapers towards the funnel 4. For example, the clamping collar 15 is spherical, i.e., it has the shape of a spherical segment. However, the clamping collar 15 is preferably conical, so that it may also be called a cone.

The pipe 5 is attached with an end section 16 facing the funnel 4 to the connection piece 10 radially on the outside. The connection piece segments 13 axially mesh now with the pipe 5 or with the end section 16 thereof. A counterclamping collar 17, which tapers away from the funnel 4, is formed integrally in one piece at the end section 16. For example, the counterclamping collar 17 may be spherical, i.e., spherical segment-shaped. However, the counterclamping collar 17 is preferably conical, so that it can also be called a countercone.

Finally, the clamp connection 7 comprises a clamp 18, which comprises a ring-shaped connection body 19 and a clamping means of a conventional design, which is not shown here. In addition, the clamp 18 may be optionally equipped with a tightening strap 20 represented by a broken line. The above-mentioned clamping means preferably cooperates with this tightening strap 20 in order to introduce a clamping force into the tightening strap 20 in the circumferential direction 11. The circumference of the tightening strap 20 and hence of the connection body 19 thus becomes shorter, as a result of which the connection body 19 is driven radially inwardly. As an alternative, the clamping means may also cooperate directly with the connection body 19 in order to reduce the circumference thereof. The connection body 19 has a V-shaped section, so that it extends radially and axially over both the clamping collar 15 and the counterclamping collar 17 and prestresses these axially against one another when the clamp 18 is tightened.

In the example being shown, the connecting sleeve 14 has a support surface 21 on a side of the clamping collar 15 facing the pipe 5. The connecting sleeve 14 is designed in the example as a deep-drawn part or shaped sheet metal part, so that the support surface 21 likewise has a conical shape. Further, provisions are made here for providing a stop face 22, which is located on a side facing the funnel 4 on the counterclamping collar 17 of the pipe 5. The two faces, i.e., the support surface 21 and the stop face 22, are coordinated with one another, so that they can be supported axially on one another, either directly or indirectly, as is shown, if, for example, a seal is arranged between the faces 21, 22.

The connecting sleeve 14 may have an interruption in the circumferential direction 11, as a result of which it will be radially springy. However, the connecting sleeve 14 is preferably free from interruptions and is circularly closed in the circumferential direction 11 and is provided with the necessary stability against pressure by a corresponding wall thickness.

The connecting sleeve 14 may, in principle, be sealed against the connection piece 10. A corresponding sealing is brought about now in an area of the connection piece 10 adjoining the openings 12. A seal may be arranged for sealing radially between the connecting sleeve 14 and the connection piece 10. It is likewise possible to fasten the connecting sleeve 14 to the connection piece 10 such that sufficient sealing is brought about at the same time. For example, a bonded connection is conceivable. However, a soldered connection or a welded connection is preferred because of the high temperatures. Such a welded connection may be embodied, for example, in the form of a circumferential seam, which is designated by 23 in FIG. 1.

In the example shown in FIG. 1, the end section 16 of the pipe 5 is made relatively massive, i.e., provided with a greater wall thickness compared to the connection piece, at least in an area having the counterclamping collar 17 and the stop face 22. For example, this area may be designed as a cast part or as a turned part. In particular, the entire end section 16 or the entire pipe 5 may have such a massive design.

According to FIG. 1, the pipe 5 may have on its inner side 25 an annular step 32, with which the connection piece 10 meshes axially with its connection piece segments 13. The inner cross section of the annular step 32 is coordinated with the outer cross section of the connection piece segment 13 such that centering becomes established between the connection piece 10 and the pipe 5 when the pipe 5 is attached to the connection piece 10.

Figure 2:
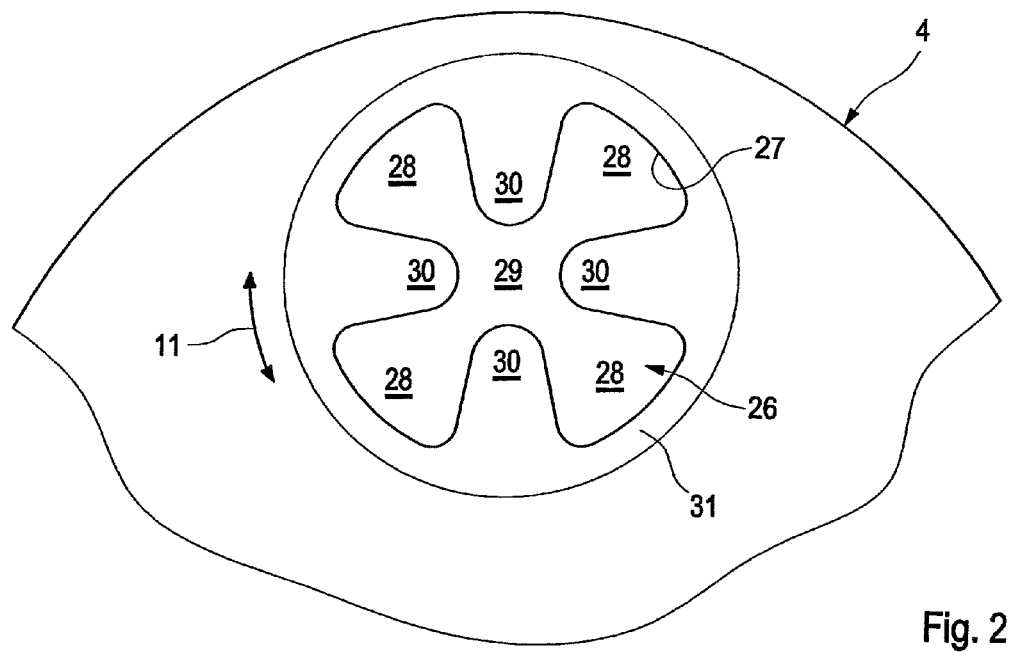
FIG. 2 is a highly simplified top view of a funnel during the manufacture of the arrangement.

A method for manufacturing the above-described arrangement 6 may be carried out as follows:

An opening 26 is prepared at first according to FIG. 2 in the funnel 4, for example, by means of a punching or cutting operation. The opening 26 has an opening cross section 27 that is star-shaped and has at least two rays 28. A quadriradial configuration, in which the star-shaped cross section 27 consequently has four rays 28, which originate from a common center 29, is shown in FIG. 2. The cross section 27 of the opening 26 is preferably shaped such that remaining funnel sections 30 in the area of the opening 26, which are arranged each between two adjacent rays 28 in the circumferential direction 11, are arranged in a detached manner in the center 29 of the opening 26, i.e., they do not touch each other.

Figure 3:
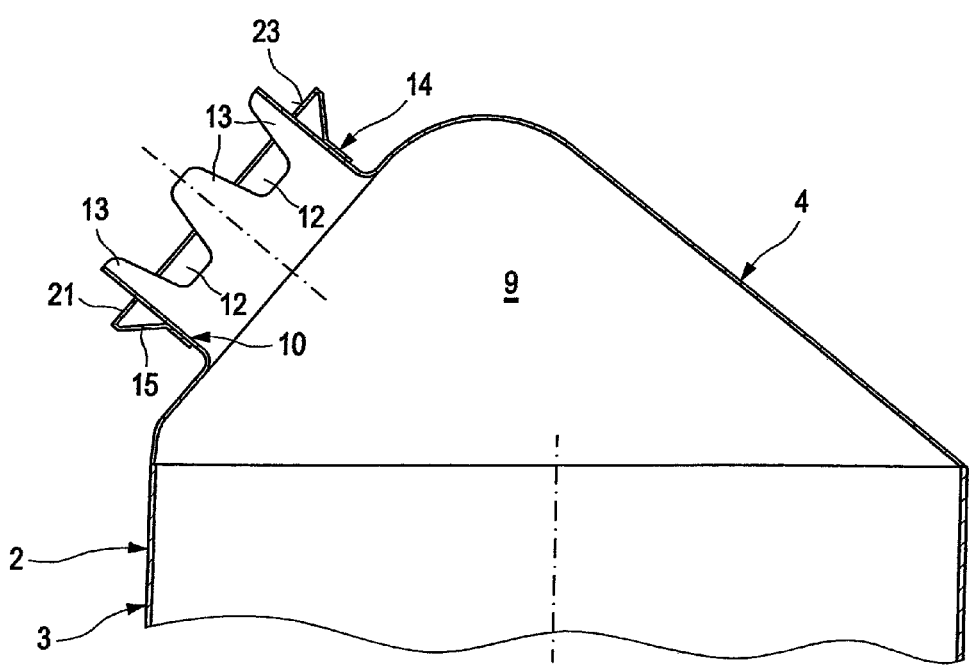
FIG. 3 is a sectional view as in FIG. 1, but during the manufacture of the arrangement.

The connection piece 10 can be subsequently manufactured according to FIG. 3 by forming the funnel 4 in the area of the opening 26. This forming is carried out by a so-called putting through, in which an area 31 of the funnel 4 having the opening 26 is formed mechanically and pressed outwardly in the process. The aforementioned funnel sections 30, which protrude into the opening 26, will then form the connection piece segments 13. The rays 28 will then form the axially open openings 12. The connecting sleeve 14 can be subsequently attached to the connection piece 10 according to FIG. 3. The connecting sleeve 14 may then optionally be welded to the connection piece 10.

After attaching the connecting sleeve 14, the pipe 5 can then be attached according to FIG. 1, and it is centered by the connection piece segments 13 protruding axially into the pipe 5, and it is fixed to the funnel 4 by means of the connecting sleeve 14.

As can be determined from FIG. 2, the opening 26 may be preferably shaped such that the individual rays 28 taper from the outside to the inside. Their opening width thus decreases towards the center 29. As was mentioned, exactly four rays 28 are provided in the example according to FIG. 2. The opening 26 will thus have a cloverleaf shape in connection with the inwardly tapering cross sections of the rays 28.

While specific embodiments of the invention have been shown and described in detail to illustrate the application of the principles of the invention, it will be understood that the invention may be embodied otherwise without departing from such principles.

What is claimed is:

1. An arrangement of a pipe on a funnel, the arrangement comprising:
   a funnel with a funnel interior space;
   a pipe having a pipe inner surface defining a pipe interior space, the pipe having an end section facing the funnel, the pipe interior space being fluidically connected with the funnel interior space;
   a clamp connection by which the pipe is fastened to the funnel, the clamp connection comprising:
   a connection piece having at least two separate, axially open openings in a circumferential direction, the connection piece being formed integrally in one piece with the funnel;
   a connecting sleeve comprising a clamping collar tapering towards the funnel, the clamping collar being formed integrally in one piece with the connecting sleeve, the connecting sleeve being attached on an outside to the connection piece, wherein the pipe is attached to the connection piece with the end section facing the funnel;
   a counterclamping collar formed integrally in one piece on the end section and tapering away from the funnel, the counterclamping collar comprising a counterclamping collar inner surface, the counterclamping collar inner surface being integrally connected to the pipe inner surface, wherein the counterclamping collar inner surface defines at least a portion of the pipe interior surface, at least a portion of the counterclamping collar inner surface being in direct contact with the connection piece; and
   a clamp comprising a ring-shaped connecting body extending over the clamping collar and extending over the counterclamping collar, the clamp prestressesing the clamping collar and the counterclamping collar axially towards one another.

2. An arrangement in accordance with claim 1, wherein:
   the clamping collar has an axial support surface on a clamping collar side facing the pipe;
   the counterclamping collar has an axial stop face at an end facing the funnel, the axial support surface being supported on the axial stop face.

3. An arrangement in accordance with claim 2, wherein the end section of the pipe comprises a cast part or turned part at least in an area having the counterclamping collar and the stop face.

4. An arrangement in accordance with claim 1, wherein the connecting sleeve is welded to the connection piece.

5. An arrangement in accordance with claim 1, wherein the counterclamping inner surface comprises a stepped portion.

6. An arrangement in accordance with claim 5, wherein the end portion comprises a first diameter and a portion of the pipe inner surface defines a second diameter, the second diameter being less than the first diameter, the portion of the pipe inner surface being located adjacent to the stepped portion.

7. A method for manufacturing an arrangement of a pipe on a funnel, the method comprising the steps of:
   providing a funnel with a funnel interior space and a pipe having a pipe inner surface defining a pipe interior space, the pipe having an end section facing the funnel;
   providing a clamp connection by which the pipe is fastened to the funnel, the clamp connection being provided by the steps comprising:
   forming a connection piece, having at least two separate, axially open openings in a circumferential direction, integrally in one piece with the funnel;
   forming a connecting sleeve comprising a clamping collar tapering towards the funnel, the clamping collar being formed integrally in one piece with the connecting sleeve, the connecting sleeve being attached on an outside to the connection piece;
   attaching the pipe to the connection piece with the end section facing the funnel to fluidically connect the pipe interior space with the funnel interior space;
   forming a counterclamping integrally in one piece on the end section and tapering away from the funnel, the counterclamping collar comprising a counterclamping collar inner surface, the counterclamping collar inner surface defiing a portion of the pipe interior surface, at least a portion of the counterclamping collar inner surface being in direct contact with the connection piece;
   providing a clamp comprising a ring-shaped connecting body extending over the clamping collar and extending over the counterclamping collar; and
   with the clamp, prestressesing the clamping collar and the counterclamping collar axially towards one another.

8. A method according to claim 7, wherein:
   an opening, which has an at least biradial, star-shaped cross section, is prepared in the funnel;
   forming the connection piece in the area of the prepared opening such with the at least two axially open openings in the circumferential direction, which said two axially open openings are formed each by a ray of a star-shaped cross section;
   attaching the connecting sleeve, with the clamping collar that tapers towards the funnel and is formed integrally in one piece on the connecting sleeve, to the connection piece;
   attaching the pipe end section to the connection piece, which pipe end section has the counterclamping collar formed integrally in one piece therewith and tapers away from the funnel; and
   mounting the clamp, which extends around the clamping collar and the counterclamping collar to provide the prestress of these axially towards each other.

9. A method in accordance with claim 8, wherein the opening of the funnel is shaped such that the rays of the cross section taper from the outside to the inside.

10. A method in accordance with claim 9, wherein the cross section of the opening of the funnel is cloverleaf-shaped.

11. A method in accordance with claim 8, wherein the cross section of the opening of the funnel has exactly three or four rays.

12. A method in accordance with claim 7, wherein the counterclamping inner surface comprises a stepped portion.

13. A method in accordance with claim 12, wherein the end portion comprises a first diameter and a portion of the pipe inner surface defines a second diameter, the second diameter being less than the first diameter, the portion of the pipe inner surface being located adjacent to the stepped portion.

14. A motor vehicle exhaust system for an internal combustion engine, the system comprising:
an exhaust gas treatment device comprising a housing;
a funnel on pipe connection arrangement providing a connection to the housing the arrangement comprising:
a funnel with a funnel interior space;
a pipe comprising a pipe inner surface defining a pipe interior space, the pipe having an end section facing the funnel, the pipe interior space being fluidically connected with the funnel interior space;
a clamp connection by which the pipe is fastened to the funnel, the clamp connection comprising:
a connection piece having at least two separate, axially open openings in a circumferential direction, the connection piece being formed integrally in one piece with the funnel;
a connecting sleeve comprising a clamping collar tapering towards the funnel, the clamping collar being formed integrally in one piece with the connecting sleeve, the connecting sleeve being attached on an outside to the connection piece, wherein the pipe is attached to the connection piece with the end section facing the funnel;
a counterclamping collar formed integrally in one piece on the end section and tapering away from the funnel, the counterclamping collar comprising a counterclamping collar inner surface, the counterclamping collar inner surface being integrally connected to the pipe inner surface, wherein the counterclamping collar inner surface defines at least a portion of the pipe interior surface, at least a portion of the counterclamping collar inner surface being in direct contact with the connection piece; and
a clamp comprising a ring-shaped connecting body extending over the clamping collar and extending over the counterclamping collar, the clamp prestressesing the clamping collar and the counterclamping collar axially towards one another.

15. A system in accordance with claim 14, wherein:
the clamping collar has an axial support surface on a clamping collar side facing the pipe;
the counterclamping collar has an axial stop face at an end facing the funnel, the axial support surface being supported on the axial stop face.

16. A system in accordance with claim 15, wherein the end section of the pipe comprises a cast part or turned part at least in an area having the counterclamping collar and the stop face.

17. A system in accordance with claim 14, wherein the connecting sleeve is welded to the connection piece.

18. A system in accordance with claim 14, wherein the counterclamping inner surface comprises a stepped portion.

19. A system in accordance with claim 18, wherein the end portion comprises a first diameter and a portion of the pipe inner surface defines a second diameter, the second diameter being less than the first diameter, the portion of the pipe inner surface being located adjacent to the stepped portion.

20. A system in accordance with claim 19, wherein at least a portion of the connection portion is located in the pipe interior space.

* * * * *